United States Patent [19]

Chute

[11] 4,185,063
[45] Jan. 22, 1980

[54] SHAPING AND STRETCHING AQUEOUS FORMIC ACID SOLUTIONS OF POLYPYRROLIDONE, FILAMENT AND FILM PRODUCTS

[76] Inventor: Challoner R. Chute, 918 Rugby Rd., Charlottesville, Va. 22903

[21] Appl. No.: 804,812

[22] Filed: Jun. 8, 1977

Related U.S. Application Data

[63] Continuation-in-part of Ser. No. 687,229, May 17, 1976, abandoned, which is a continuation of Ser. No. 547,033, Feb. 4, 1975, abandoned.

[51] Int. Cl.² .................. C08G 69/24; D01D 5/12
[52] U.S. Cl. .................. 264/210; 260/29.2 N;
264/203; 264/210.6; 264/178 F; 264/205;
528/326; 264/212; 264/289.3; 264/288.4
[58] Field of Search .................. 260/29.2 N, 78 P;
264/178 F, 184, 181, 203, 210; 528/326

[56] References Cited

U.S. PATENT DOCUMENTS

| | | | |
|---|---|---|---|
| 2,360,406 | 10/1944 | Dreyfus et al. | 264/203 |
| 2,611,929 | 9/1952 | Hoxie | 264/181 |
| 2,711,398 | 6/1955 | Barnes et al. | 8/4 |
| 2,980,641 | 4/1961 | Cox | 260/29.2 N |
| 3,060,141 | 10/1962 | Black | 260/29.2 N |
| 3,060,153 | 10/1962 | Follett | 260/78 P |
| 3,269,970 | 8/1966 | Epstein et al. | 264/203 |
| 3,324,061 | 6/1967 | Tanquary et al. | 260/29.2 N |

Primary Examiner—Murray Tillman
Assistant Examiner—Arthur H. Koeckert
Attorney, Agent, or Firm—Dennis P. Clarke

[57] ABSTRACT

A method of preparing shaped polypyrrolidone articles having a high degree of tensile strength comprising forming said articles from solutions of polypyrrolidone in hydrous formic acid and drawing said articles while impregnated with said hydrous formic acid. The invention also includes the step of enhancing the tenacity of shaped polypyrrolidone articles by impregnation thereof with hydrous formic acid and drawing said impregnated articles.

8 Claims, No Drawings

SHAPING AND STRETCHING AQUEOUS FORMIC ACID SOLUTIONS OF POLYPYRROLIDONE, FILAMENT AND FILM PRODUCTS

BACKGROUND OF THE INVENTION

This is a continuation-in-part application of U.S. Ser. No. 687,229, filed May 17, 1976, which is a continuation of U.S. Ser. No. 547,033, filed Feb. 4, 1975, both now abandoned.

Polypyrrolidone, formed by the polymerization of 2-pyrrolidone, commonly termed Nylon-4 is used for the formation of films and fibers of high strength. Methods for the preparation of polypyrrolidone are described in U.S. Pat. No. 2,638,463 of May 12, 1953.

It has also been suggested in U.S. Pat. No. 2,711,398 of June 21, 1955 to form fibers and films from anhydrous solutions of polypyrrolidone and formic acid. The patent specifies that the utilization of anhydrous formic acid, i.e., 98-100%, is critical to the practice of the invention.

U.S. Pat. No. 2,889,611 to Bedell of June 9, 1959 discloses the treatment of various Nylon polymer filaments with strong solutions of formic acid under such conditions that the portion of Nylon dissolved in the formic acid solution is re-deposited or re-coated upon the external surface of the Nylon filament, which treatment increases the flexibility of the filament without decreasing the tensile strength thereof.

U.S. Pat. No. 3,060,141 discloses a method for preparing shaped articles from aqueous solutions of formic acid. The patent discloses the utilization of aqueous formic acid solutions containing from 10-50% by weight of water.

SUMMARY OF THE INVENTION

It is an object of the present invention to provide a composition and method for preparing shaped polypyrrolidone articles having higher tensile strength and other more desirable properties than those formed according to the processes described in the above U.S. patents.

These and other objects are achieved by providing a solution of polypyrrolidone in hydrous formic acid solution, forming the article from said solution and drawing or stretching the article while impregnated with the hydrous formic acid solution to provide articles having higher tensile strength and other properties heretofor unattainable in polypyrrolidone materials.

These and other objects are also achieved by impregnating formed polypyrrolidone articles with hydrous formic acid solutions and drawing or stretching the thus impregnated article in order to increase their tensile strength and enhance the other properties thereof.

DETAILED DESCRIPTION OF THE INVENTION

It is essential to the practice of the invention that a substantially hydrous formic acid solution be employed for forming the polypyrrolidone articles. More specifically, it is critical to the practice of the invention that formic acid solutions containing from about 3 to about 20% by weight of water be utilized to form the polypyrrolidone solutions. Preferably, formic acid solutions containing from 3 to 9% by weight of water have been found to be particularly valuable in forming articles of the highest tensile strength from polypyrrolidone.

When employing formic acid solutions containing more than about 20% by weight of water, there is a tendency for the solutions to gel. When employing formic acid solutions containing less than about 3% by weight of water, weaker fibers and more opaque films are produced.

In order to achieve satisfactory production of strong fibers, filaments, and films, the ratio of polypyrrolidone to hydrous formic acid solutions must be at least about 20% by weight. Obviously, the higher the polymer concentration in the solution, the more optimum the conditions for the formation of filaments and fibers. As the molecular weight of the polypyrrolidone employed increases, however, the less polymer is usually required for the formation of suitable fibers and filaments.

It is preferred to employ solutions comprising from about 1.5 to about 4 parts by weight of hydrous formic acid per part of polypyrrolidone. This range has been found suitable for the formation of strong shaped articles of polypyrrolidone from all molecular weight ranges of polypyrrolidone employing 80-97% hydrous formic acid.

It is generally preferred to employ polypyrrolidone having a molecular weight corresponding to a relative viscosity within the range of about 2 to about 10, as determined by the relative viscosity of a 1% solution thereof in metacresol. It is more specifically preferred to employ polypyrrolidone having a relative viscosity of from about 3 to about 6. The most preferred viscosity range is from about 2.5 to about 4.2.

Fairly rapid dissolution of the polypyrrolidone in the hydrous formic acid may be achieved by merely mixing the two materials. However, in order to speed up solution in the case of the high molecular weight polypyrrolidone, gentle heating up to about 60° C. may be employed. At higher temperatures decomposition or depolymerization of the polypyrrolidone may occur.

Fibers, filaments, and films of suitable denier may be formed by conventional wet- or solution-spinning methods. It is a critical element of the invention that the fibers, filaments or films formed be immediately drawn or stretched in order to achieve the highest degree of tensile strength. It has been found that the hydrous formic acid residues in the shaped articles assist in the drawing process and act to enhance the tensile strength thereof. The precise mechanism behind the enhancement of tensile strength and other properties of the shaped polypyrrolidone articles is not known. However, the absence of hydrous formic acid residues in the shaped articles during drawing in stretching results in articles having markedly lower tensile strengths than articles cold drawn in the presence of the hydrous formic acid.

The shaped articles may be prepared without the utilization of heat; however, warm or hot air for purposes of solvent recovery, etc., may be utilized if undertaken at less than about 92° C. for short periods of time to prevent degradation.

Suitable additives for modifying the properties of the polypyrrolidone may be included in the polypyrrolidone-hydrous formic acid solutions. For example, Nylon 6 and Nylon 66 or other amidic systems may be included in minor proportions to impart various desired properties to the ultimate shaped articles. Fire retardants, dyes, and other additives conventionally employed in the plastics industry may also be incorporated.

Films may be formed from the hydrous formic acid solutions of polypyrrolidone by any conventional method. The films must then be immediately drawn or stretched to achieve the highest possible tensile strength.

As noted above, the invention also includes a method for enhancing the tensile strengths and other properties of shaped polypyrrolidone articles comprising treating the said articles with an at least substantially hydrous formic acid solution for a period of time sufficient to achieve impregnation thereof followed by drawing or stretching.

It is to be understood that shaped polypyrrolidone articles containing water may be treated with anydrous formic acid under conditions such that impregnation results in the formation of hydrous formic acid solutions of the above concentration within the article.

It is conventional in the art of manufacturing fibers, filaments, films, etc., to "cold-draw" the shaped article after it has been formed. It is to be understood that the method of the present invention does not contemplate "cold-drawing" in the conventional sense. It is critical to the practice of the invention that the article be impregnated with the hydrous formic acid during the drawing operation. The articles may be drawn immediately following the method of formation from the hydrous formic acid thereby decreasing the costs involved since it is unnecessary to dry the articles prior to drawing as in the conventional cold-drawing processes.

The articles formed from the hydrous formic acid solutions or treated therewith following formation are drawn from about 100 to about 800% elongation, preferably from about 400 to about 600% elongation.

It is to be understood that when impregnating the already-formed polypyrrolidone articles, the impregnation may be accomplished utilizing either solutions of formic acid or vapors thereof. Obviously, the concentration of the formic acid and the time of immersion are mutually dependent.

The invention is further illustrated by the following non-limiting Examples.

EXAMPLE 1

One part by weight of polypyrrolidone having a relative viscosity of 4 as determined by the relative viscosity of a 1% solution thereof in metacresol is gradually and slowly dissolved in 4 parts of hydrous formic acid (90% by weight). The solution was agitated until no polymer is visible and until all air pockets have been removed from the resulting viscous solution. Fibers of about 4 denier were wet-spun from this solution and immediately drawn about 300% elongation while still impregnated with formic acid to yield fibers having 0.93 denier and 33 g per denier tensile strength and 22% elongation at break. The procedure was carried out in air without the use of a coagulating bath.

Substantially identical fibers from an identical solution which were only partially drawn were dried and cold-drawn to the same extent yielding fibers having a tensile strength of only 5.1 g/denier.

Fibers from identical solutions were prepared, only partially drawn, dried and then cold-drawn according to the procedure described above to yield fibers having the following characteristics before and after solution-drawing and cold-drawing.

|  | Tensile Strength | | |
| --- | --- | --- | --- |
| Denier | Drawing Impregnated fibers - Grams per denier | Denier | Cold-drawing Grams per denier |
| 1.73 | 16.7 | 1.90 | 3.4 |
| 2.23 | 19.4 | 1.55 | 4.3 |
| 1.68 | 24.1 | 0.26 | 4.5 |

The invention includes the shaped polypyrrolidone articles of increased tensile strength produced according to the above-described process. Generally, these articles possess a tensile strength above 10 grams per denier.

When treating shaped polypyrrolidone articles to enhance the tensile strength thereof it is generally preferred to employ hydrous formic acid solution containing from about 15% to less than about 50% by weight of formic acid.

The time of treatment may vary, depending upon the concentration of the solution. Generally, when employing the more dilute formic acid solutions, it is necessary to expose the polypyrrolidone articles to the solution for a minimum time of about one hour. When utilizing the more concentrated solutions, the time of treatment is generally shortened considerably to about 15 minutes or less since longer treatment times lead to a partial decomposition of the articles. At the lower concentrations, there is no danger of decomposition, even over a period of hours.

It is to be understood that small amounts of acetic acid or other lower carboxylic acids may be present in the treating solution without affecting the method of the invention.

EXAMPLE 2

Identical melt-spun polypyrrolidone filaments were subjected to treatment with aqueous formic acid solutions of varying strengths for the purpose of enhancing the tensile strength thereof.

The parameters of the tests and the results thereof are set forth in Table 1 below:

|  | Denier | Tenacity Gram Per Denier | Percent Increase or Decrease | Elongation at break | Percent Increase or Decrease |
| --- | --- | --- | --- | --- | --- |
| Control Cold Drawn Melt Spun Nylon 4 (Control) | 3949 | 2.2 |  | 31 |  |
| TREATMENT |  |  |  |  |  |
| 1. 50% Soln. 5 mins. immersion then cold drawn | 3000 | 2.00 | negligible | 28 | negligible |
| 2. 50% soln. 15 mins. immersion then cold drawn | 3247 | 2.2 | none | 54 | 64 |

| | Denier | Tenacity Gram Per Denier | Percent Increase or Decrease | Elongation at break | Percent Increase or Decrease |
|---|---|---|---|---|---|
| 3. 30% soln. 15 mins. immersion then cold drawn | 4274 | 2.1 | negligible | 47 | 42 |
| 4. 30% soln. 7 hrs. immersion then cold drawn | 5860 | 3.0 | 35 | 50 | 51 |
| 5. 30% soln. 30 mins. immersion then cold | | 2.87 | 29 | 50 | 51 |

This invention also includes a method for the enhancement of the elastomeric properties of formed polypyrrolidone articles such as filaments, etc. The method applies to both pre-drawn and drawn filaments; however, the method is particularly applicable to the treatment of pre-drawn filaments. Table 1 illustrates the enhancement of the elastomeric properties of undrawn filaments.

Generally, the filaments and other shaped articles are treated in the same manner as described above with respect to the enhancement of the tensile strength of the filaments. The parameters of treatment and the results of the test as applied to pre-drawn filaments are set forth in Table 2.

It will be understood that filaments or fibers of any size and shape may be formed according to the method of the present invention. Generally, filaments and fibers having a minimum denier of 0.02 (0.8 microns) may be prepared according to the present invention.

TABLE 2

| | Denier | Elongation Percent | Percent Change |
|---|---|---|---|
| Control-Cold Drawn Melt Spun Nylon 4 | 3150 | 31 | |
| Cold Draw Before Immersion | | | |
| Immersed 25% soln 1 hour | 3924 | 120 | 287 gain |
| Immersed 40% soln 2 mins. | 4202 | 127 | 311 gain |
| Immersed 50% soln 6 mins. | 3826 | 70 | 126 gain |
| Immersed 50% soln 5 mins. | 3789 | 68 | 119 gain |

I claim:

1. A method of preparing a shaped polypyrrolidone article of enhanced tensile strength comprising shaping a solution consisting essentially of polypyrrolidone and 1.5 to 4 parts, by weight, per part of polypyrrolidone of aqueous formic acid containing from 3% to 9%, by weight, of water into an article of desired shape and stretching said article while still impregnated with aqueous formic acid.

2. The method of claim 1 wherein said polypyrrolidone has a relative viscosity of from about 2 to about 10 based on a 1%, by weight, solution in metacresol.

3. The method of claim 2 wherein said polypyrrolidone has a relative viscosity of from about 3 to about 6.

4. The method of claim 1 wherein said article is drawn from about 100 to about 800% elongation.

5. The method of claim 1 wherein said article is drawn from about 400 to about 600% elongation.

6. The product produced according to claim 1.

7. The method of claim 1 wherein said shaped article is a filament formed by spinning said solution.

8. The method of claim 1 wherein said shaped article is a film formed by casting said solution.

* * * * *